(12) United States Patent
Wagner et al.

(10) Patent No.: US 7,660,054 B2
(45) Date of Patent: Feb. 9, 2010

(54) THERMALLY CONTROLLED SOLD IMMERSION LENS FIXTURE

(75) Inventors: Cameron Wagner, Beaverton, OR (US); David Shykind, Sherwood, OR (US); Travis Eiles, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 11/771,222

(22) Filed: Jun. 29, 2007

(65) Prior Publication Data

US 2009/0002855 A1    Jan. 1, 2009

(51) Int. Cl.
*G02B 7/02* (2006.01)
(52) U.S. Cl. ........................ 359/820; 359/819
(58) Field of Classification Search ......... 359/811–819; 385/123; 606/16
See application file for complete search history.

(56) References Cited

U.S. PATENT DOCUMENTS 7,382,399 B1 *  6/2008  McCall et al. ......... 348/207.99
2005/0259933 A1 * 11/2005  Temelkuran et al. ........ 385/123

* cited by examiner

*Primary Examiner*—Timothy J Thompson
(74) *Attorney, Agent, or Firm*—Kevin A. Reif

(57) ABSTRACT

Embodiments allow for uniform die cooling or heating with a solid immersion lens equipped microscope over a larger temperature range than is currently attainable using liquid coolant. The SIL tip is insulated from the rest of the objective body to realize a controllable temperature. This thermal control may be done by convection or Joule heating. If the tip is to be cooled, cold gas may be injected through channels around the tip and fins. If the tip is to be heated, hot gas may be injected around the tip and fins 208 or an electrical heater may be thermal anchored to the tip and a current passed through it to deliver power.

13 Claims, 2 Drawing Sheets

THERMALLY CONTROLLED SOLD IMMERSION LENS FIXTURE

FIELD OF THE INVENTION

Embodiments of the present invention are directed to solid immersion lenses and, more particularly, to thermally controlled solid immersion lenses.

BACKGROUND INFORMATION

Optical spatial resolution, or the ability to clearly resolve closely placed structures, is important in many fields and of particular interest in the field of chip imaging equipment. Infrared optical techniques for silicon debug and fault isolation, such as emission microscopy (IREM), laser probing (LVP), time-resolved emission (TRE), and Laser Assisted Device Alteration (LADA), all rely on high-resolution microscope objective lenses which function in the near infrared (1.0-1.5 µm) portion of the electromagnetic spectrum.

With the advent of ultra-small features in silicon processes, the resolution of these microscopes, as denoted proportionately to the inverse of their numerical apertures (NA), have been improved to better resolve and collect data. For example, a modern 65 nm process technology features transistors whose gate length is just 35 nm; the gate essentially being the switch that turns a transistor on and off. By way of comparison, it has been said that approximately 100 of these gates could fit inside the diameter of a human red blood cell. To resolve images on microprocessors manufactured by this process, a 0.85 numerical aperture (NA) objective may be used with emission microscopy (IREM) and Laser Assisted Device Alteration (LADA) and a 1.4 NA oil immersion lens may be suitable with time resolved emission (TRE) and laser probing (LVP).

However, as features get smaller, a "solid immersion lens" (SIL) with numerical aperture of 2.45 may be needed for LVP and TRE. Eventually it is likely that a solid immersion lens (SIL) may be needed for all techniques, including LADA and IREM, due to the shrinking geometries of transistors and layout design rules.

A solid immersion objective comprises a final lens at the tip of the microscope objective that is generally hemispherical and has a flat side that is pressed into direct contact with the silicon. One major engineering challenge to be overcome in using such optical probe methods is that the integrated circuit (IC) under analysis must remain at a controlled temperature during the test, with chip cooling under realistic operating conditions as the main challenge.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Described is a device and method which allows for uniform die cooling or heating with a solid immersion lens (SIL) equipped microscope over a larger temperature range than is currently attainable using present methods such as liquid coolant. Further, embodiments allow for better temperature regulation under the SIL tip itself, and avoids the expensive infrastructure and/or hazards associated with liquid coolants.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As previously noted, one major engineering challenge to be overcome in using optical probe methods is that the IC under analysis must remain at a controlled temperature during the test, with chip cooling under realistic operating conditions as a primary challenge. This is because microprocessors and other IC's can dissipate as much as 100 W/cm$^2$ during normal operation.

Since the heat spreader is removed to allow optical access through the substrate, the conventional cooling means for the package is missing during probing (i.e. testing). One current solution to this problem is a Chemical Vapor Deposition (CVD)-deposited diamond-based "transparent heat spreader." This is a transparent diamond window that is soldered into a cooling chuck. This chuck is then firmly fixed into the socket and load board so that the diamond window is in firm contact with the polished substrate. Heat dissipated within the chip is conducted into the diamond (the material with the highest known thermal conductivity) then laterally out into the cooling chuck.

Unfortunately, the diamond window thermal solution just described is not compatible with the solid immersion lens, since the diamond window is in firm contact with the entire silicon substrate, while the optics of the solid immersion lens (SIL) dictates that the hemispherical final element be in contact with the substrate. One cooling solution that is now in use with the SIL is a form of spray cooling, in which high-pressure jets of water or other coolant are sprayed on the chip surface everywhere except in the region where the relatively small tip of the SIL is pressed into contact with the silicon.

Figure 1:
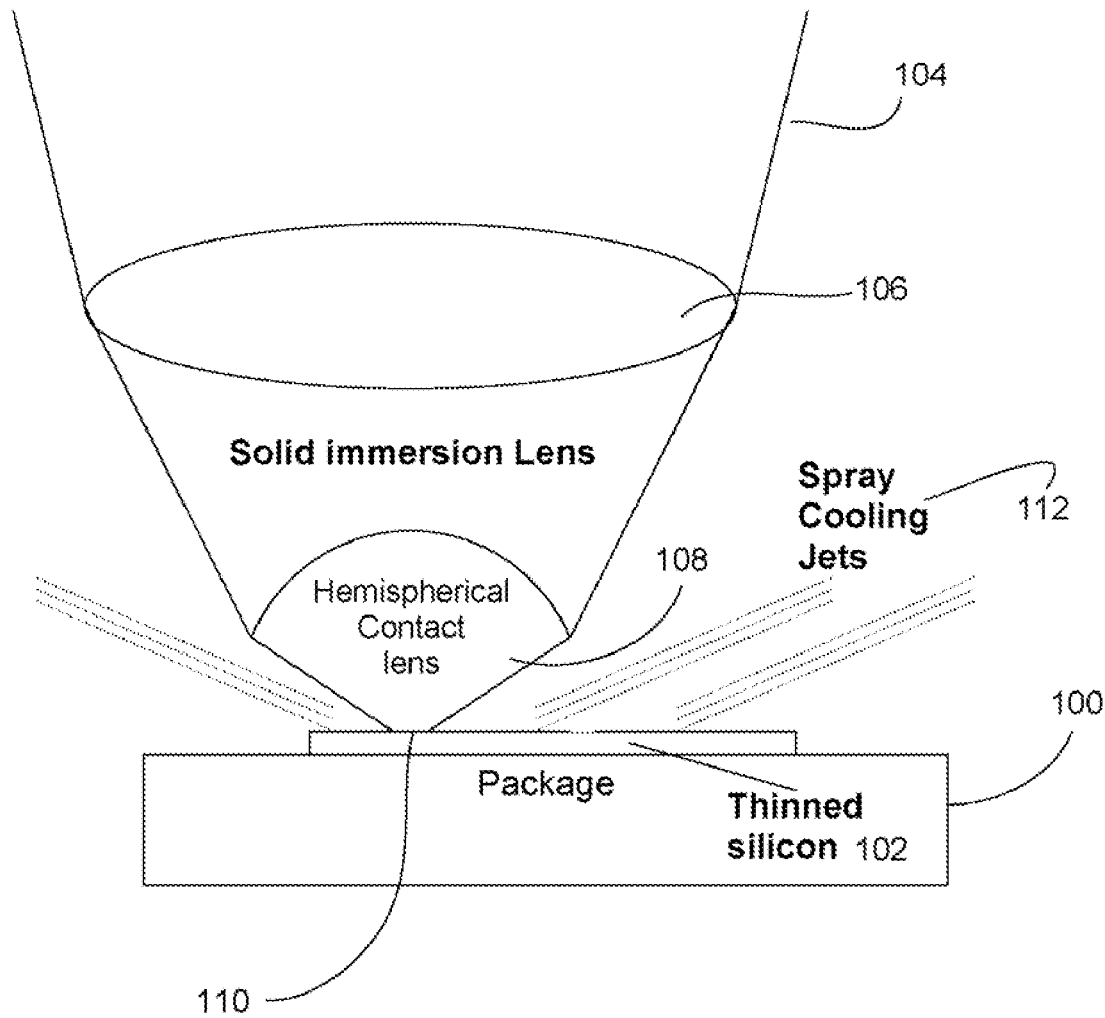
FIG. 1 is a diagram showing a solid immersion lens (SIL) probing the backside of a chip using jet cooling spray for thermal control.

FIG. 1 shows a solid immersion lens imaging a silicon substrate with a liquid coolant to keep the package at normal operating temperatures during the imaging. A package 100 comprises a device under test (DUT). Here, the DUT may be a silicon substrate 102 comprising, for example, a microprocessor. A solid immersion lens 104 comprises one or more lenses or objectives 106 and a hemispherical contact lens 108. The tip 110 of the contact lens 108 is shown in contact with the silicon 102 which is at operating temperature. Since the heat sink has been removed in order to make contact, spray cooling jets 112 spray a liquid coolant on the silicon 102 to keep it from over heating and in normal operating temperature ranges while imaging. This has proven to be an effective cooling solution for most cases; however, it has at least two deficiencies.

First, the range of chip temperatures that can be obtained is limited, especially for high power microprocessors which must reach low temperatures as well as for low power microprocessors or other integrated circuits which must reach high temperatures. Presently existing spray cooling is based on water spray, and thus the fluid temperature cannot be dropped below about 5 degrees-C. This means that for a high power density (say 100 W/cm$^2$), the junction temperature cannot be held below about 60 degrees-C. due to the limitation of the thermal transfer with spray cooling. In a similar vein, the water temperature at present cannot be raised above about 60 degrees-C. without threatening the reliability of the system. This means that a chip cannot be heated to above 60 degrees-C. unless it self-heats appreciably and low-power integrated circuits do not heat up much under their own power.

Second, another drawback to the spray cooling shown in FIG. 1 is the need to collect, pump, and thermally control the spray liquid, particularly when several lower-magnification lenses are used as with IREM and LADA. This adds substantially to system complexity, and may make the system cost prohibitive.

Figure 2:
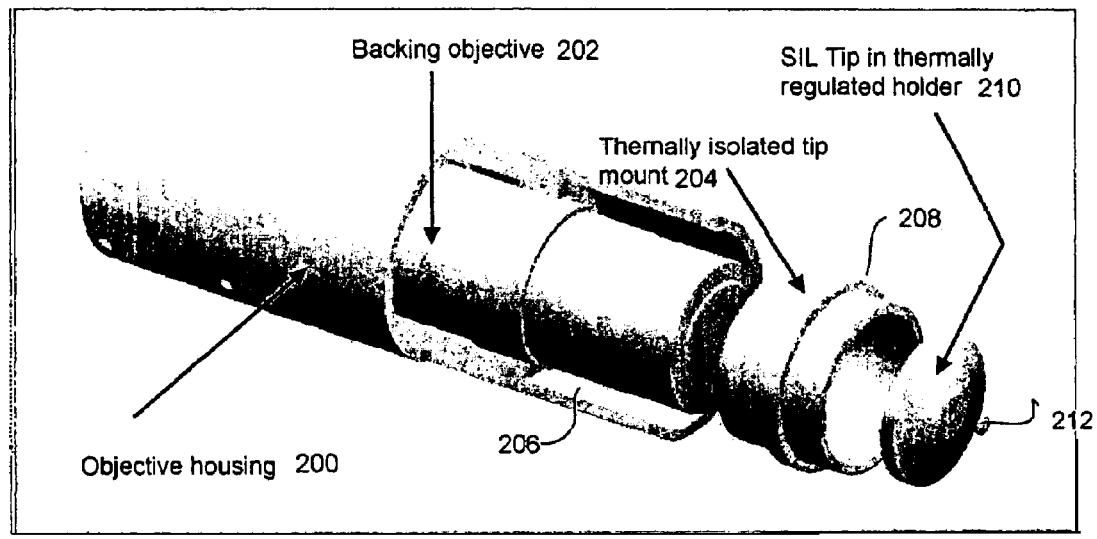
FIG. 2 is a diagram of a thermally controlled SIL according to one embodiment of the inventions.
Figure 3:
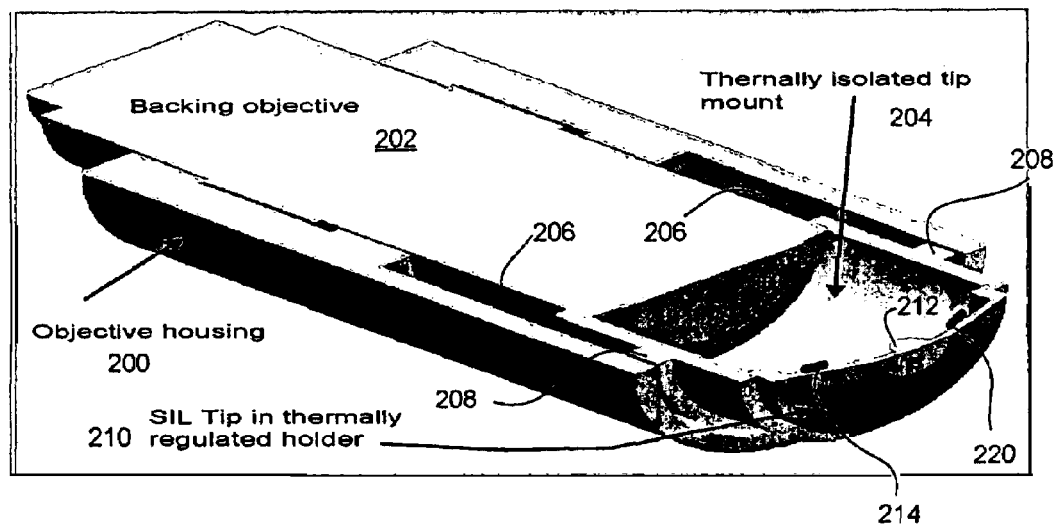
FIG. 3 is a cutaway view of the thermally controlled SIL according to one embodiment of the invention.

Referring now to FIGS. 2 and 3, an embodiment of the invention comprises a solid immersion lens (SIL) tip holder and associated hardware. More specifically, a generally cylindrical objective housing 200 includes a backing objective 202 that fits within the objective housing 200. A purpose of the backing objective 202 to collect the light from the SIL and relay a magnified image from the SIL tip to the remainder of the microscope or other optical (e.g., spectroscopic) system (not shown). While the objective housing 200 is shown as cylindrical other shapes may also be suitable. A thermally isolated tip mount 204, also shown generally cylindrical, is sized to fit within the end of the objective housing 200 and may form channels 206 for the introduction of heated or cooled gas. Fins 208 may be positioned on or around the mount 204. A thermally regulated holder or cap 210 may fit onto the tip mount 204 for holding the hemispherical contact lens 212 of the SIL.

The SIL tip 210 may be thermally regulated using electrical means such as heating wires or tape 214 wrapped or incorporated into the SIL holder, or by the incorporation of thermally conductive tubes or channels 206 into the conical SIL tip holder 210. Thermal sensors 220 may be incorporated into the body of the conical SIL holder to allow for closed-loop thermal regulation of the SIL holder 210.

The SIL holder 210 should be connected to the objective housing 200 by an insulating material so that the SIL tip 210 can be thermally controlled while not affecting the temperature of the rest of the objective 202. The insulating material may be any easily machinable thermal insulator.

The SIL tip 210, insulated from the rest of the objective body, should reach a controllable temperature. This thermal control can be done by convection or Joule heating. If the tip 210 is to be cooled, cold gas may be injected around the tip and its fins 208 (convection) through channel 206. If the tip 210 is to be heated, hot gas may be injected around the tip and its fins 208 (convection) or an electrical heater 220 may be thermal anchored to the tip and a current passed through it to deliver power.

Embodiments allow for uniform die cooling or heating with a SIL equipped microscope over a larger temperature range than is currently attainable using liquid coolant. Further, it allows for better temperature regulation under the SIL tip itself and avoids the expensive infrastructure and/or hazards associated with liquid coolants. Additionally, the uniform HSP provides more even heating or cooling than jets of coolant, which can be blocked or diverted or exhibit non-uniform flow around the SIL tip during operation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A solid emersion lens apparatus, comprising:
   an objective housing;
   a backing objective within the objective housing;
   a thermally isolated tip mount at one end of the objective housing;
   a tip capping the thermally isolated tip mount to hold a contact lens; and
   a channel near the thermally isolated tip mount to introduce a gas at a controlled temperature to heat or cool a device under test (DUT) when contacting the tip.

2. The apparatus as recited in claim 1 further comprising a fin in contact with the tip mount for convention heating or cooling.

3. A solid emersion lens apparatus, comprising:
   an objective housing;
   a backing objective within the objective housing;
   a thermally isolated tip mount at one end of the objective housing;
   a tip capping the thermally isolated tip mount to hold a contact lens;
   a channel near the thermally isolated tip mount to introduce a gas at a controlled temperature; and
   a heating element for heating the tip.

4. The apparatus as recited in claim 1 wherein the contact lens comprises a hemispherical contact lens.

5. A solid emersion lens apparatus, comprising:
   an objective housing;
   a backing objective within the objective housing;
   a thermally isolated tip mount at one end of the objective housing;
   a tip capping the thermally isolated tip mount to hold a contact lens; a channel near the thermally isolated tip mount to introduce a gas at a controlled temperature; and
   a thermal sensor for sensing the temperature near the tip.

6. The apparatus as recited in claim 1 wherein the gas introduced in the channel is heated.

7. The apparatus as recited in claim 1 wherein the gas introduced in the channel is cooled.

8. A method for imaging a device under test (DUT), comprising:
   providing a housing containing backing objectives;
   providing a lens in a tip of the housing, the tens to be in physical contact with the device under test;
   thermally insulating the lens from the backing objective; and
   controlling the temperature of the device under test (DUT) contacting the tip from within the housing.

9. The method as recited in claim 8, further comprising:
   providing a channel within the housing; and
   introducing a temperature controlled gas flowing within the channel.

10. The method as recited in claim 9 further comprising:
    cooling the gas flowing within the channel.

11. The method as recited in claim 9 further comprising:
heating the gas flowing within the channel.

12. A method for imaging a device under test, comprising:
providing a housing containing backing objectives;
providing a lens in a tip of the housing, the tens to be in physical contact with the device under test;
thermally insulating the lens from the backing objective;
controlling the temperature at the tip from within the housing; and
heating the tip with an electric heating element.

13. A method for imaging a device under test, comprising:
providing a housing containing backing objectives;
providing a lens in a tip of the housing, the tens to be in physical contact with the device under test;
thermally insulating the lens from the backing objective;
controlling the temperature at the tip from within the housing; and
sensing the temperature at the tip to control the temperature of the gas.

* * * * *